(12) United States Patent
Druenert et al.

(10) Patent No.: US 7,638,235 B2
(45) Date of Patent: Dec. 29, 2009

(54) INTERNAL PROTON EXCHANGE MEMBRANE HUMIDIFICATION AND COOLING WITH AUTOMOTIVE COOLANT

(75) Inventors: Volker Druenert, Russelsheim (DE); George R. Woody, Redondo Beach, CA (US); Annette M. Brenner, Honeoye Falls, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 648 days.

(21) Appl. No.: 11/534,380

(22) Filed: Sep. 22, 2006

(65) Prior Publication Data
US 2008/0075993 A1 Mar. 27, 2008

(51) Int. Cl.
G05D 22/00 (2006.01)
G05D 23/00 (2006.01)
H01M 10/50 (2006.01)
H01M 8/04 (2006.01)

(52) U.S. Cl. ............... 429/120; 429/26; 429/34; 429/72; 429/81; 429/82; 429/89

(58) Field of Classification Search ............ None
See application file for complete search history.

(56) References Cited

U.S. PATENT DOCUMENTS

| 4,824,741 | A | * | 4/1989 | Kunz | 429/26 |
| 5,176,966 | A | * | 1/1993 | Epp et al. | 429/26 |
| 5,776,624 | A | * | 7/1998 | Neutzler | 429/26 |
| 6,316,135 | B1 | * | 11/2001 | Breault et al. | 429/22 |
| 6,794,077 | B2 | * | 9/2004 | Yi et al. | 429/34 |
| 2004/0072043 | A1 | * | 4/2004 | Hashimoto et al. | 429/25 |
| 2007/0082245 | A1 | * | 4/2007 | Druenert | 429/26 |

* cited by examiner

Primary Examiner—Melvin C Mayes
Assistant Examiner—Colin W Slifka

(57) ABSTRACT

A bipolar plate for a fuel cell including pores extending between cooling fluid flow channels and reactant gas flow channels defined by the plate. Pervaporation membranes cover the pores and selectively allow water in the cooling fluid flowing down the cooling fluid flow channels to pervaporate through the membrane and humidify the reactant gas flowing down the reactant gas flow channels. In one embodiment, the bipolar plate includes two stamped unipolar plates secured together.

31 Claims, 2 Drawing Sheets

INTERNAL PROTON EXCHANGE MEMBRANE HUMIDIFICATION AND COOLING WITH AUTOMOTIVE COOLANT

BACKGROUND OF THE INVENTION

1. Field of the Invention

This invention relates generally to bipolar plates for fuel cells and, more particularly, to a bipolar plate for a fuel cell that includes holes or pores covered by a pervaporation membrane that allows only water from the stack cooling fluid to enter the reactant gas flow channels to provide fuel cell membrane humidification.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer-electrolyte proton-conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs require certain conditions for effective operation, including proper water management and humidification.

Several fuel cells are typically combined in a fuel cell stack to generate the desired power. For the automotive fuel cell stack mentioned above, the stack may include about two hundred or more fuel cells. The fuel cell stack receives a cathode reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

Excessive stack temperatures may damage the membranes and other materials in the stack. Fuel cell systems therefore employ a thermal sub-system to control the temperature of the fuel cell stack. Particularly, a cooling fluid is pumped through the cooling fluid flow channels in the bipolar plates in the stack to draw away stack waste heat. During normal fuel cell stack operation, the speed of the pump is controlled based on the stack load, the ambient temperature and other factors, so that the operating temperature of the stack is maintained at an optimal temperature, for example 80° C. A radiator is typically provided in a coolant loop outside of the stack that cools the cooling fluid heated by the stack where the cooled cooling fluid is cycled back through the stack. The cooling fluid is typically an automotive cooling fluid, such a water/glycol mixture, where the glycol prevents the cooling fluid from freezing.

As is well understood in the art, fuel cell membranes operate with a certain relative humidity (RH) so that the ionic resistance across the membrane is low enough to effectively conduct protons. Providing the membrane with the right amount of humidity is one of the key challenges of fuel cell systems.

As mentioned above, water is generated as a by-product of the stack operation. Therefore, the cathode exhaust gas from the stack will include water vapor and liquid water. It is known in the art to use a water vapor transfer (WVT) unit to capture some of the water in the cathode exhaust gas, and use the water to humidify the cathode input airflow. Other devices, such as a cathode exhaust gas recirculation pump, the WVT device, water recovery and spray injection devices, etc. may also be required. WVT units and their required components tend to be rather expensive and occupy a large amount of space in fuel cell system designs. Therefore, eliminating the WVT device will not only decrease the cost of the system, but also decrease the packaging space. Further, handling of liquid water in sub-zero conditions offers various design challenges to prevent freezing and the like.

U.S. Pat. No. 6,794,077 issued Sep. 21, 2004 to Yee et al., titled Passive Water Management Fuel Cell, discloses a method for humidifying a fuel cell stack reactant gas flow internal to the stack. In this system, a constant water flux from cooling fluid water is supplied to the fuel reactant gas channels through weep holes. The design of the system requires that only de-ionized water to be used as the stack cooling fluid. Because only deionized water can be used as the cooling fluid, there are significant concerns of cooling fluid freezing that need to be addressed.

SUMMARY OF THE INVENTION

In accordance with the teachings of the present invention, a bipolar plate for a fuel cell is disclosed that includes pores extending between cooling fluid flow channels and reactant gas flow channels defined by the plate. Pervaporation membranes cover the pores or pervaporation membrane plugs are inserted in the pores. The membranes selectively allow only water in the cooling fluid flowing down the cooling fluid flow channels to pervaporate through the membrane and humidify the reactant gas flowing down the reactant gas flow channels. In one embodiment, the bipolar plate includes two stamped metal unipolar plates secured together.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system for humidifying reactant gas flow channels in a fuel cell stack is merely exemplary in nature, and is in no way intended to limit the invention or its applications or uses.

Figure 1:
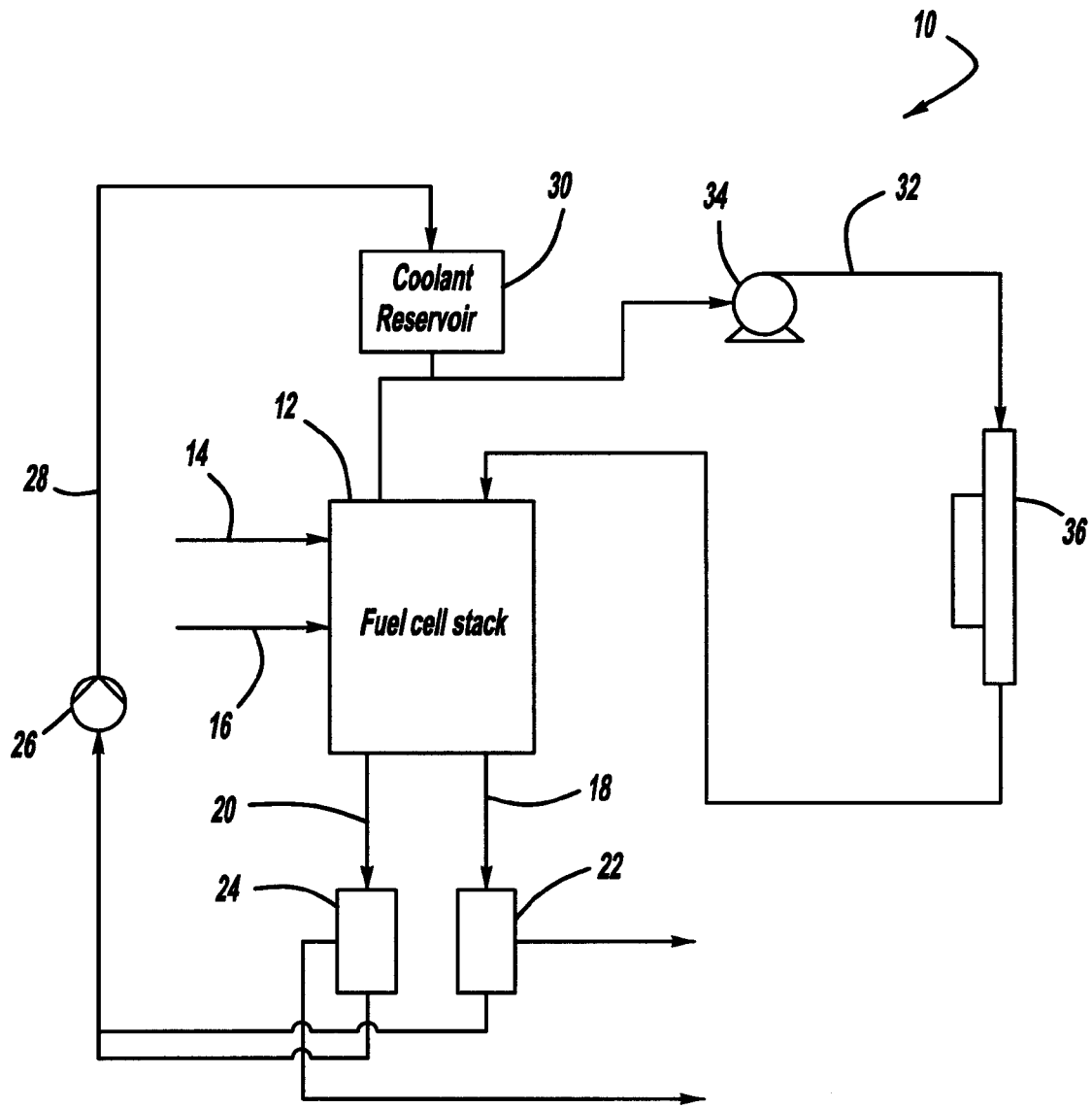
FIG. 1 is a plan view of a fuel cell system.

FIG. 1 is a schematic plan view of a fuel cell system 10 including a fuel cell stack 12. Cathode air is sent to the cathode flow channels of the fuel cell stack 12 on line 14 and hydrogen fuel is sent to the anode flow channels of the fuel cell stack 12 on line 16. A cathode exhaust gas is output from the fuel cell stack 12 on line 18 and an anode exhaust gas is output from the fuel cell stack 12 on line 20. A water separator 22 separates water from the cathode exhaust gas and a water separator 24 separates water from the anode exhaust gas. The water separated by the water separators 22 and 24 is pumped by a pump 26 on line 28 to a cooling fluid reservoir 30. A cooling fluid flows through cooling fluid channels in the fuel cells 12 and through a cooling fluid loop 32 outside of the stack 12. The cooling fluid is pumped through the stack 12 and the cooling fluid loop 32 by a pump 34. The heated cooling fluid from the stack 12 is cooled by a radiator and fan assembly 36. The cooling fluid can be any cooling fluid suitable for the purposes discussed herein, such as a water/glycol solution.

Figure 2:
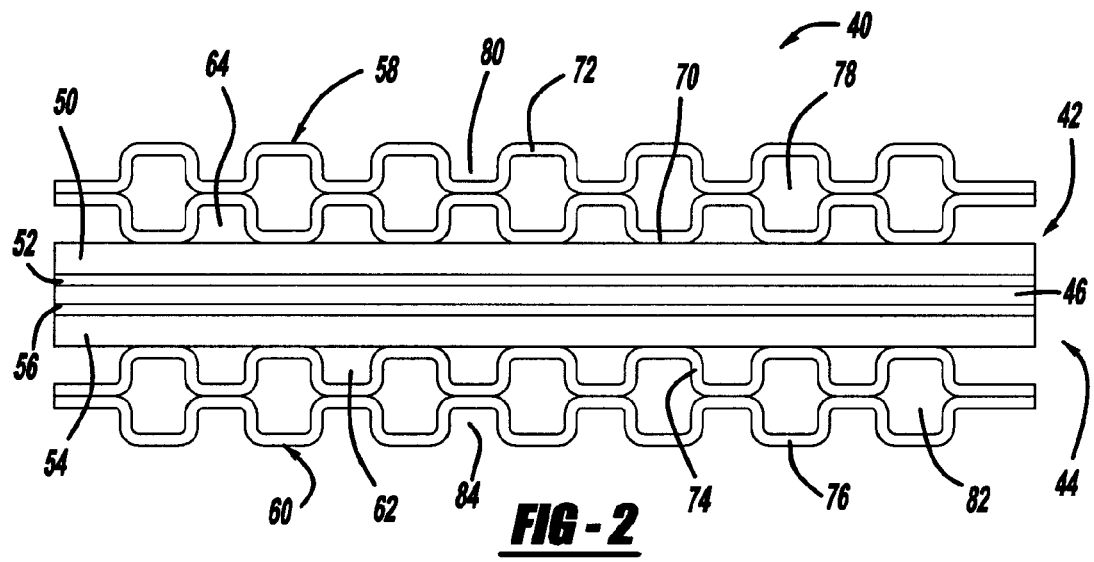
FIG. 2 is a cross-sectional view of a fuel cell in the fuel cell stack shown in FIG. 1.

FIG. 2 is a cross-sectional view of a fuel cell 40 that is part of the fuel cell stack 12. The fuel cell 40 includes a cathode side 42 and an anode side 44 separated by a membrane 46, such as a perfluorosulfonic acid membrane or other suitable membrane. A cathode side diffusion media layer 50 is provided on the cathode side 42, and a cathode side catalyst layer 52 is provided between the membrane 46 and the diffusion media layer 50. Likewise, an anode side diffusion media layer 54 is provided on the anode side 44, and an anode side catalyst layer 56 is provided between the membrane 46 and the diffusion media layer 54. The catalyst layers 52 and 56 and the membrane 46 define an MEA. The diffusion media layers 50 and 54 are porous layers that provide for input gas transport to and water transport from the MEA. Various techniques are known in the art for depositing the catalyst layers 52 and 56 on the diffusion media layers 50 and 54, respectively, or on the membrane 46.

A cathode side flow field plate or bipolar plate 58 is provided on the cathode side 42 and an anode side flow field plate or bipolar plate 60 is provided on the anode side 44. The bipolar plates 58 and 60 are provided between the fuel cells in the fuel cell stack 12. A hydrogen reactant gas flow from flow channels 62 in the bipolar plate 60 reacts with the catalyst layer 56 to dissociate the hydrogen ions and the electrons. Airflow from flow channels 64 in the bipolar plate 58 reacts with the catalyst layer 52. The hydrogen ions are able to propagate through the membrane 46 where they carry the ionic current through the membrane 46. The end product is water, which does not have any negative impact on the environment.

The bipolar plate 58 includes two unipolar plates 70 and 72 and the bipolar plate 60 includes two unipolar plates 74 and 76. In this embodiment, the unipolar plates 70-76 are stainless steel plates that are stamped to the configuration as shown. However, the unipolar plates 70-76 can be any suitable conductive metal or composite material that can be formed into the shape desirable for a bipolar plate. The unipolar plates 70 and 72 are then bonded together by a suitable process, such as welding, to define the complete bipolar plate 58. Likewise, the unipolar plates 74 and 76 are bonded together to form the complete bipolar plate 60. By bonding the unipolar plates 70 and 72 in this manner, the bipolar plate 58 includes cooling fluid flow channels 78 provided between the unipolar plates 70 and 72, and anode flow channels 80 for the anode side of an adjacent fuel cell. Likewise, the bipolar plate 60 includes cooling fluid flow channels 82 provided between the unipolar plates 74 and 76 and cathode flow channels 84 for the cathode side of an adjacent fuel cell.

The present invention proposes eliminating the external humidification devices, such as WVT units, in certain fuel cell system designs, and use the water in the cooling fluid traveling through the cooling fluid flow channels 78 and 82 to humidify the membrane 46. Typically, the cooling fluid is a water/ethylene glycol mixture, where the glycol is used to prevent the cooling fluid from freezing in sub-zero environments. However, the glycol in the cooling fluid mixture would have a detrimental impact on the MEAs if it were allowed to enter the reactant gas flow channels.

Figure 3:
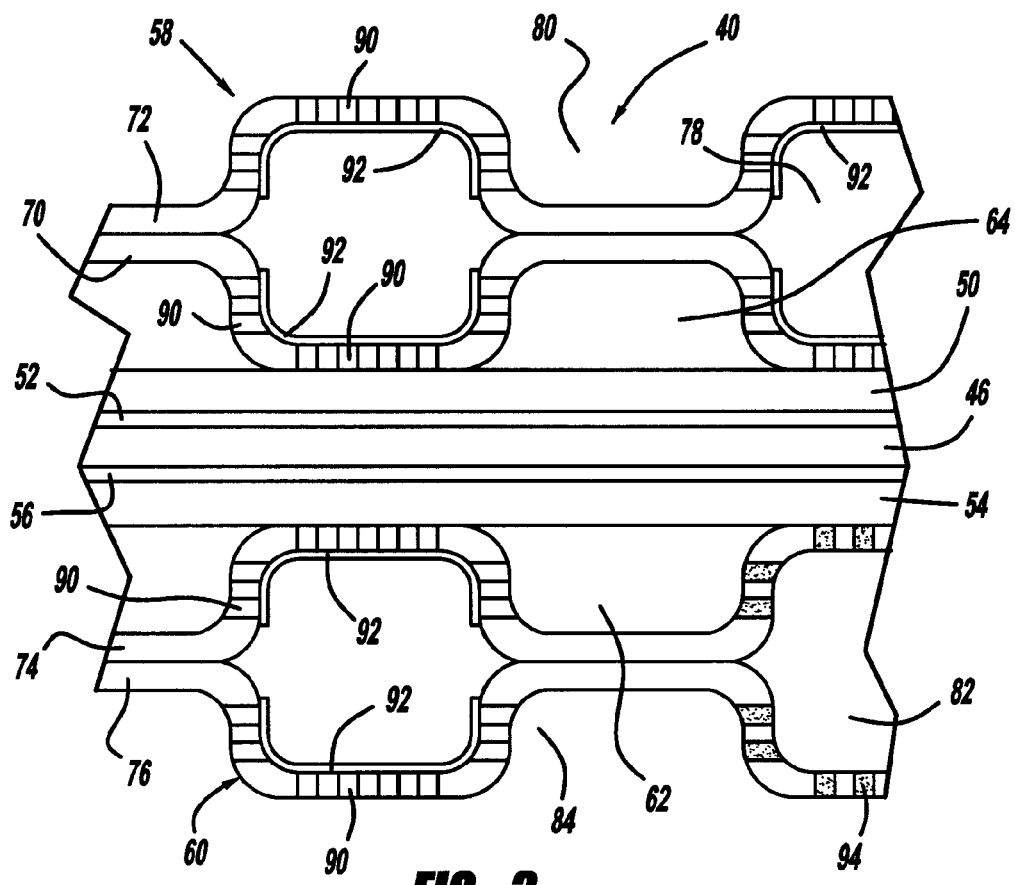
FIG. 3 is a close-up view of a portion of the fuel cell shown in FIG. 2, including flow holes or pores and pervaporation membranes for allowing water in the cooling fluid flow channels to pervaporate the reactant gas flow channel, according to an embodiment of the present invention.

FIG. 3 is a close-up view of a portion of the fuel cell 40. A series of holes or pores 90 are provided in the unipolar plates 58 and 60 around the circumference of the cooling fluid flow channels 78 and 82 to provide a flow path between the cooling fluid flow channels 78 and 80 and the reactant gas flow channels 62 and 64. According to the invention, pervaporation membranes 92 are provided on an inside surface of the cooling fluid flow channels 78 and 82 to cover the holes or pores 90. In an alternate embodiment, the membranes 92 can be eliminated and each hole or pore 90 can be filled with a pervaporation compound, where the actual hole or pore 90 acts as the supportive structure for the compound. An example of such a pervaporation compound is shown as membrane plugs 94 in a few of the pores 90. The plugs 94 can be deposited within the pores 90 by any suitable process, such as dipping the unipolar plate in a solution of pervaporation material, spraying the unipolar plate with a pervaporation material, brushing a pervaporation material on the unipolar plate, etc. Once the pervaporation material dries, the pores 90 will be filled with the pervaporation material, and a film of the pervaporation material may exist on a surface of the unipolar plates 70-76. Thus, as will be appreciated by those skilled in the art, the term "pervaporation membrane" as used herein refers to all types of pervaporation materials that fill the pores 90 or are inserted in the pores 90.

The pervaporation membranes 92 are a selective pervaporation membrane in that they allow water to propogate therethrough, and prevent the glycol from propagating therethrough. Water that pervaporates through the membranes 92 evaporates on an opposite side of the membrane 92 so that water vapor enters the reactant gas flow channels 62 and 64. The water vapor is picked up by the reactant gas flowing through the flow channels 62 and 64 and is carried through the diffusion media layers 50 and 54 to the membrane 46. Membranes and compounds that have a pervaporation characteristic are well known to those skilled in the art.

As will be appreciated by those skilled in the art, other types of cooling fluid solutions other than water/glycol solutions may be applicable for other fuel cell stack designs. Various anti-freezing additives can be added to water within the scope of the present invention, such as ethanol, methanol, ethylene glycol, ammonia or salt solutions, such as $CaCl_2$, NaCl and $K_2CO_3$. Any additive that lowers the freezing point of the cooling fluid to the desired temperature can potentially be used.

As discussed above, pervaporation is a separation process where a liquid phase contacts a non-porous permaselective membrane. One component is transported through the membrane, and evaporates on an opposite side of the membrane leaving a vapor. Permeation is induced by lowering the partial pressure of the water. Pervaporation membranes typically are of two types. Particularly, hydrophilic pervaporation membranes remove water from organic solutions, and hydrophobic membranes remove organic compounds from water. In one non-limiting embodiment, the membranes 92 are composite membranes with a cross-linked poly-vinyl alcohol (PVA) active layer dip coated on a polyethersulfone support membrane. As will also be appreciated by those skilled in the art, other pervaporation materials deposited in other ways may be applicable, such as those that may be deposited on the unipolar plate 70-76 to form the plugs 94. For example, the pervaporation membrane can include, polyacrylamide (PAAM), polyacrylonitrile (PAN), chitosan (CS), polysulfone composite materials, alginate, and layered or composite membranes of similar materials. Also, PVA-GPTMS/TEOS hybrid pervaporation membranes can be used, including organic/inorganic hybrid membranes prepared by co-hydrolysis and co-condensation of glycidyloxypropyltrimethoxysilnlane (GPTMS) and tetraethoxysiliane (TEOS) in a PVA aqueous solution. Promising results were also obtained using ionically surface cross-linked chitosan membranes. Permeation rates of up to 1.7 kg/m²/h with a 90% glycol and 10% water mixture at 75° C. has been reported in the literature.

The pressure of the cooling fluid flow and the pressure differential between the cooling fluid flow and the reactant gas flow are primarily given parameters based on the design of the fuel cell. In general, the cooling fluid pressure should follow the reactant gas pressure within a certain margin. Partial pressure differences between the cooling fluid flow channels 78 and 82 and the reactant gas flow channels 62 and 64 is the driving force for the water transportation through the membranes 92. According to equation (1) below, increasing the cooling fluid pressure compared to the reactant gas pressure will increase the water flux through the membrane 92.

$$J_i = \frac{Q_i P_i^{sat}}{l}(a_{if} - a_{ip}) \quad (1)$$
$$= \frac{Q_i P_i^{sat}}{l}\left(y_i^\infty x_i - \frac{P_i}{P_i^{sat}}\right)$$
$$= \frac{Q_i(P_i^{sat} y_i^\infty x_i - P_i)}{l}$$

Where $J_i$ is the water flux (mol/m²s), Q is the overall permeability for the membrane (mol m²/m³s Pa), $p^{sat}$ is the saturated vapor pressure of pure water (Pa), $a_f$ is the activity of water in the feed stream, $a_p$ is the activity of water in the product stream, P is the partial pressure of the water (Pa), x is the mole fraction of the fluid in liquid phase, $y^\infty$ is the activity coefficient of water in an infinite diluted aqueous solution and l is the thickness of membrane 92.

The diameter of the holes or pores 90, the number of the holes or pores 90 and the configuration of the holes or pores 90 would be application specific and would be provided by suitable testing. The original metal sheet used to stamp the unipolar plates 70-76 can be formed with a special configuration of the stamped holes or pores 90 to provide the desired configuration before the sheet is stamped. The holes or pores 90 may or may not extend the entire length of the flow channels, may be evenly spaced along the length of the cooling fluid flow channels 78 and 82, or may be grouped in clusters along the cooling fluid flow channels 78 and 82 depending on how much humidification was desired. Further, it may not be necessary to provide holes or pores in every cooling fluid flow channels, where the holes or pores 90 may be provided in every other alternating flow channel. Also, the membranes 92 can be bonded to the inside surface of the unipolar plates in the cooling fluid flow channels by any suitable process, such as gluing or dipping. Further, in other embodiments, the membranes 92 may be on the outside surface of the unipolar plates 70-76.

Another aspect of providing internal humidification in this manner using the selective pervaporation membrane 92 is the improved internal cooling of the fuel cell stack 12 because of the energy required for the evaporation of the water. Particularly, because the membranes 92 cause the water to evaporate on the reactant gas flow side of the membranes 92, the evaporation process draws heat from the fuel cell based on the following equation.

$$dH_{evaporation}[kW] = \{m_{H_2O}[kg/s] * 2250[kJ/kg] \quad (2)$$
$$= 0.006.5 * [kg/s] * 2250[kJ/kg]$$
$$= 14/6 kW$$

The process of drawing water out of the cooling fluid for humidification purposes as discussed above will reduce the amount of water in the cooling fluid. However, there is a wide range of varying concentrations of water to glycol in the cooling fluid suitable for the fuel cell stack 12 that would provide the proper cooling and freeze reduction. Also, the product water separated by the water separators 22 and 24 that fill the coolant reservoir 30 can be used to replace the lost water in the cooling fluid.

Further, the pervaporation membranes 92 operate such that the higher the temperature of the cooling fluid, the more water is evaporated in the reactant gas flow channels 62 and 64. This is important because as the temperature of the fuel cell stack 12 increases, more humidification is required to maintain the wetness of the membrane 46. Therefore, the operation of the pervaporation membrane 92 satisfies this requirement.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell comprising:
   a membrane electrode assembly (MEA); and
   a first bipolar plate positioned on one side of the MEA, said first bipolar plate including a first unipolar plate and a second unipolar plate bonded together, said first and second unipolar plates of the first bipolar plate defining cathode reactant gas flow channels facing the MEA, anode reactant gas flow channels facing away from the MEA and cooling fluid flow channels, said first and second unipolar plates of the first bipolar plate including a plurality of pores extending through the unipolar plates between the cooling fluid flow channels and the anode and cathode reactant gas flow channels, and wherein the first bipolar plate includes at least one pervaporation membrane positioned relative to the pores that selectively allows water in a cooling fluid flowing through the cooling fluid flow channels to pervaporate through the pores and enter the reactant gas flow channels as water vapor.

2. The fuel cell according to claim 1 wherein the at least one pervaporation membrane includes a plurality of pervaporation membranes where each membrane covers a plurality of pores.

3. The fuel cell according to claim 2 wherein the at least one pervaporation membrane includes two separate pervaporation membranes for each cooling fluid flow channel.

4. The fuel cell according to claim 3 wherein the pervaporation membranes are positioned within the cooling fluid flow channels.

5. The fuel cell according to claim 1 wherein the at least one pervaporation membrane is a plurality of membrane compound plugs positioned within the pores.

6. The fuel cell according to claim 1 wherein the at least one pervaporation membrane is deposited on the first bipolar plate by a process selected from the group consisted of dipping the first bipolar plate in a solution of a pervaporation material, spraying a pervaporation material on the first bipolar plate and brushing a pervaporation material on the first bipolar plate.

7. The fuel cell according to claim 1 wherein the cooling fluid is a water/glycol mixture, and wherein the at least one pervaporation membrane prevents the glycol in the cooling fluid from pervaporating therethrough.

8. The fuel cell according to claim 1 wherein the first and second unipolar plates are stamped metal plates.

9. The fuel cell according to claim 8 wherein the stamped metal plates are stainless steel plates.

10. The fuel cell according to claim 1 wherein the first and second unipolar plates are composite plates.

11. The fuel cell according to claim 1 further comprising a diffusion media layer positioned between the MEA and the first bipolar plate, wherein the holes that extend through the first bipolar plate facing the MEA are positioned proximate the diffusion media layer.

12. The fuel cell according to claim 1 further comprising a second bipolar plate positioned on the other side of the MEA, said second bipolar plate including a third unipolar plate and a fourth unipolar plate bonded together, said third and fourth unipolar plates of the second bipolar plate defining anode reactant gas flow channels facing the MEA, cathode reactant gas flow channels facing away from the MEA and cooling fluid flow channels, said third and fourth unipolar plates of the second bipolar plate including a plurality of pores extending through the unipolar plates between the cooling fluid flow channels and the anode and cathode reactant gas flow channels, and wherein the second bipolar plate includes at least one pervaporation membrane positioned relative to the pores that selectively allows water in the cooling fluid flowing through the cooling fluid flow channels to pervaporate through the pores and enter the reactant gas flow channels as water vapor.

13. The fuel cell according to claim 1 wherein the at least one pervaporation membrane is a composite membrane with a cross-linked poly-vinyl alcohol active layer on a polyethersulfone support membrane or an ionically surface cross-linked chitosan composite membrane.

14. The fuel cell according to claim 1 wherein the at least one pervaporation membrane is selected from a membrane material consisting of a cross-linked poly-vinyl alcohol, polyacrylamides, polyacrylonitriles, chitosans, polysulfones, alginate, glycidyloxypropyltrimethoxysilnanes and tetraethoxysilianes.

15. The fuel cell according to claim 1 wherein the cooling fluid includes an additive selected from the group consisting of ethanol, methanol, ethylene glycol, ammonia and salt solutions.

16. A fuel cell comprising:
a membrane electrode assembly (MEA);
a cathode side bipolar plate positioned on one side of the MEA, said cathode side bipolar plate including a first unipolar plate and a second unipolar plate bonded together, said first and second unipolar plates of the cathode side bipolar plate defining cathode reactant gas flow channels facing the MEA, anode reactant gas flow channels facing away from the MEA and cooling fluid flow channels, said first and second unipolar plates of the cathode side bipolar plate including a plurality of pores extending through the first and second unipolar plates between the cooling fluid flow channels and the anode and cathode reactant gas flow channels, said cathode side bipolar plate further including a plurality of pervaporation membranes positioned over the pores where one pervaporation membrane covers the pores facing the cathode reactant gas flow channels and another pervaporation membrane covers the pores facing the anode reactant gas flow channels in each cooling fluid flow channel; and
an anode side bipolar plate positioned on the other side of the MEA, said anode side bipolar plate including a third unipolar plate and a fourth unipolar plate bonded together, said third and fourth unipolar plates of the anode side bipolar plate defining anode reactant gas flow channels facing the MEA, cathode reactant gas flow channels facing away from the MEA and cooling fluid flow channels, said third and fourth unipolar plates of the anode side bipolar plate including a plurality of pores extending through the third and fourth unipolar plates between the cooling fluid flow channels and the anode and cathode reactant gas flow channels, said anode side bipolar plate further including a plurality of pervaporation membranes positioned over the pores were one pervaporation membrane covers the pores facing the anode reactant gas flow channels and another pervaporation membrane covers the holes facing the cathode reactant gas flow channels in each cooling fluid flow channel, wherein the pervaporation membranes selectively allow water in a cooling fluid flowing through the cooling fluid flow channels to pervaporate through the pores and enter the reactant gas flow channels as water vapor.

17. The fuel cell according to claim 16 wherein the cooling fluid is a water/glycol mixture, and wherein the pervaporation membranes prevent the glycol in the cooling fluid from pervaporating therethrough.

18. The fuel cell according to claim 16 wherein the first, second, third and fourth unipolar plates are stamped metal plates.

19. The fuel cell according to claim 18 wherein the stamped metal plates are stainless steel plates.

20. The fuel cell according to claim 16 wherein the first, second, third and fourth unipolar plates are composite plates.

21. The fuel cell according to claim 16 wherein the plurality of pervaporation membranes are a composite membrane with a cross-linked poly-vinyl alcohol active layer on a polyethersulfone support membrane or an ionically surface cross-linked chitosan composite membrane.

22. The fuel cell according to claim 16 further comprising a cathode side diffusion medial layer positioned between the MEA and the cathode side bipolar plate and an anode side diffusion media layer positioned between the MEA and the anode side bipolar plate, wherein the pores that extend through the anode and cathode side bipolar plates facing the MEA are positioned proximate to the cathode side and anode side diffusion media layers.

23. A bipolar plate for a fuel cell, said bipolar plate defining reactant gas flow channels and cooling fluid flow channels, said bipolar plate including a plurality of pores extending through a plate between the reactant gas flow channels and the cooling fluid flow channels, said bipolar plate further including at least one pervaporation membrane positioned relative to the pores and allowing water in a cooling fluid flowing through the cooling fluid flow channels to pervaporate through the membrane and into the reactant gas flow channels.

24. The bipolar plate according to claim 23 wherein the at least one pervaporation membrane includes a plurality of pervaporation membranes where each membrane covers a plurality of pores.

25. The bipolar plate according to claim 24 wherein the at least one pervaporation membrane includes two separate pervaporation membranes for each cooling fluid flow channel.

26. The bipolar plate according to claim 25 wherein the pervaporation membranes are positioned within the cooling fluid flow channels.

27. The bipolar plate according to claim 23 wherein the at least one pervaporation membrane is a plurality of membrane compound plugs positioned within the pores.

28. The fuel cell according to claim 23 wherein the at least one pervaporation membrane is deposited on the bipolar plate by a process selected from the group consisted of dipping the bipolar plate in a solution of a pervaporation material, spraying a pervaporation material on the bipolar plate and brushing a pervaporation material on the bipolar plate.

29. The bipolar plate according to claim 23 wherein the bipolar plate further includes a first unipolar plate and a second unipolar plate, where the first unipolar plate defines cathode reactant gas flow channels and the second unipolar plate defines anode reactant gas flow channels.

30. The bipolar plate according to claim 29 wherein the unipolar plates are stamped metal plates.

31. The bipolar plate according to claim 23 wherein the cooling fluid is a water/glycol mixture, and wherein the pervaporation membrane prevents the glycol in the cooling fluid from pervaporating therethrough.

* * * * *